(12) United States Patent
Hijman et al.

(10) Patent No.: US 11,065,833 B2
(45) Date of Patent: Jul. 20, 2021

(54) FLEXIBLE CORE FOR MACHINE PROCESSING OR PRODUCTION OF COMPOSITE PARTS OR MATERIALS

(71) Applicant: Lantor B.V., Veenendaal (NL)

(72) Inventors: Robert Johannes Hijman, Aarlanderveen (NL); Ward Antonius Steijn, Ede (NL)

(73) Assignee: Lantor B.V., Veenendaal (NL)

( * ) Notice: Subject to any disclaimer, the term of this patent is extended or adjusted under 35 U.S.C. 154(b) by 0 days.

(21) Appl. No.: 16/308,181

(22) PCT Filed: Jun. 9, 2017

(86) PCT No.: PCT/NL2017/050385
§ 371 (c)(1),
(2) Date: Dec. 7, 2018

(87) PCT Pub. No.: WO2017/213508
PCT Pub. Date: Dec. 14, 2017

(65) Prior Publication Data
US 2019/0184654 A1 Jun. 20, 2019

(30) Foreign Application Priority Data
Jun. 10, 2016 (NL) ..................... 2016945

(51) Int. Cl.
*B29C 70/66* (2006.01)
*B32B 5/26* (2006.01)
(Continued)

(52) U.S. Cl.
CPC .......... *B29C 70/66* (2013.01); *B29C 44/1209* (2013.01); *B29C 70/086* (2013.01); *B32B 5/022* (2013.01); *B32B 5/18* (2013.01); *B32B 5/20* (2013.01); *B32B 5/245* (2013.01); *B32B 5/26* (2013.01); *B32B 27/065* (2013.01); *B32B 27/308* (2013.01); *B29K 2101/10* (2013.01); *B29K 2105/0076* (2013.01); *B29K 2105/0854* (2013.01); *B29K 2995/0097* (2013.01); *B32B 2260/021* (2013.01); *B32B 2260/046* (2013.01); *B32B 2262/0246* (2013.01); *B32B 2262/0253* (2013.01); *B32B 2262/0269* (2013.01); *B32B 2262/0276* (2013.01); *B32B 2262/101* (2013.01); *B32B 2262/103* (2013.01); *B32B 2262/105* (2013.01); *B32B 2262/106* (2013.01);
(Continued)

(58) Field of Classification Search
CPC B32B 5/20; B32B 5/245; B32B 5/022; B29C 70/66; B29K 2105/0076
See application file for complete search history.

(56) References Cited

FOREIGN PATENT DOCUMENTS

| CN | 86100673 A | 10/1986 |
|---|---|---|
| CN | 1646311 A | 7/2005 |

(Continued)

*Primary Examiner* — Hai Vo
(74) *Attorney, Agent, or Firm* — Verrill Dana, LLP

(57) ABSTRACT

The invention is directed to a core material, suitable for use in a closed mold system, based on at least one fibrous web containing a foam-structure within the web, said foam-structure being formed of a plurality of members that are separated from each other by channels, wherein said core material has a compression-resistance of greater than 40% at a pressure of 4 bar and at a temperature that is greater than or equal to 80° C.

21 Claims, 6 Drawing Sheets

(51) Int. Cl.
    *B29C 44/12*     (2006.01)
    *B29C 70/08*     (2006.01)
    *B32B 5/20*     (2006.01)
    *B32B 27/30*     (2006.01)
    *B32B 5/18*     (2006.01)
    *B32B 5/24*     (2006.01)
    *B32B 5/02*     (2006.01)
    *B32B 27/06*     (2006.01)
    *B29K 105/00*     (2006.01)
    *B29K 101/10*     (2006.01)
    *B29K 105/08*     (2006.01)

(52) U.S. Cl.
    CPC ... *B32B 2262/14* (2013.01); *B32B 2266/0221* (2013.01); *B32B 2266/0242* (2013.01); *B32B 2307/54* (2013.01); *B32B 2307/542* (2013.01); *B32B 2307/732* (2013.01)

(56) References Cited

FOREIGN PATENT DOCUMENTS

| | | | |
|---|---|---|---|
| EP | 1925416 A1 | 5/2008 | |
| KR | 10-1998-078332 A | 11/1998 | |
| KR | 10-2005-0084583 A | 8/2005 | |
| WO | WO9729900 A1 | 8/1997 | |
| WO | WO-2004028776 A1 * | 4/2004 | ............. B29C 70/66 |

* cited by examiner

FLEXIBLE CORE FOR MACHINE PROCESSING OR PRODUCTION OF COMPOSITE PARTS OR MATERIALS

The invention is in the field of core materials for use in a closed mold system in the production of fiber reinforced plastic materials. The invention is particularly directed to core materials for use in autoclave molding processes at elevated temperatures and pressures as well as to a method for the preparation of the core materials.

Fiber-reinforced plastics are composite materials based on a polymer resin such as an epoxy, vinylester or polyester and fibers such as glass, carbon, aramid, or basalt. Fiber-reinforced plastics find applications in a large variety of fields such as automotive, aviation, road signs, windmills, boats, industrials parts and the like. The presence of the fibers in the polymer materials results in increased strength, stiffness, fatigue life, fracture toughness, environmental resistance, increased temperature stability, reduced weight and the like.

A core material can be incorporated in the fiber-reinforced plastics in order to reduce the amount of resin required, reduce the weight of the composite material and/or to increase the mechanical properties, such as the bending stiffness. The use of core materials is known in the art.

Fiber-reinforced plastics comprising core materials are typically manufactured manually (hand lay-up; spray-up) or by using closed mold systems for e.g. vacuum-infusion processes, resin transfer molding (RTM) or autoclave. Closed mold systems are preferred over the manual manufacture in view of i.a. reproducibility of the material properties of the product, improved surface properties, environmental consideration (less loss of resin) and reduced overall manufacturing costs because of higher production speed.

To increase the production speed further, autoclave molding processes may be used. Autoclave molding is generally a modification of commonly applied pressure-bag and vacuum-bag molding processes. Pressure-bag and vacuum-bag molding processes typically involve filing a mold with the reinforcement fibers, the resin and the core material, followed by placing the filled mold in a bag and increasing or reducing the pressure in the bag to force out possibly entrained air and/or excess resin. In autoclave molding, the pressurized or vacuumed bag is placed in an autoclave to cure the resin. Curing of the resin may take place under a pressure up to about 8 bar and at temperature ranging from 80° C. to about 170° C. Besides the increase production speed due to faster curing of the resin, autoclave molding generally results in denser and essentially void-free compositions.

Any used core material preferably meets a number of requirements for a successful application. These requirements include i.a. sufficient drapability (i.e. a sufficiently low bending stiffness), sufficient flow of resin through or into the core material, low resin uptake and a sufficient compression-resistance. Since fiber-reinforced plastic products are often three-dimensionally shaped, the mold that is used typically has a contoured surface corresponding to the shape of the article. Because the fibers and core materials are placed onto this surface, it is preferred that the core material is drapable such that they conform to the contoured surface of the mold. The core materials are preferably also characterized by good compression-resistance (i.e. related to the applied pressures during the application of the core material).

The compression-resistance is defined herein as the ability to resist a force that tends to crush or buckle the core material. It is measured by determining the height of the material before applying a pressure and during applying a certain elevated pressure (e.g. 4 bar) perpendicular to the plane of the core material. The compression-resistance at a certain pressure is calculated as 100%×(height of the material at the elevated pressure)/(height of the material at atmospheric pressure). The compression-resistance thus indicates the remaining thickness and volume of the core material and the amount of resin it replaces in the fiber-reinforced plastic. To determine the compression-resistance a universal testing machine, for instance a machine available from Zwick Roell AG being equipped with heating plates can be used.

Core materials that meet the above requirements for applications at about 1 bar pressure and room temperature (meaning that no external heating is applied and the only heat is generated by the curing of the resin itself) are described in EP1010793 and EP1542845, which are both incorporated herein in their entirety. However, the increased temperature and pressures that are associated with autoclave molding processes or other applications involving elevated pressures and temperatures, pose a challenge for the currently available core materials, in particular for the compression-resistance of the core materials. Given the advantages of elevated pressures and temperatures in the production of fiber-reinforced plastics, it is desirable to have a core material that is applicable under such conditions.

Figure 1:
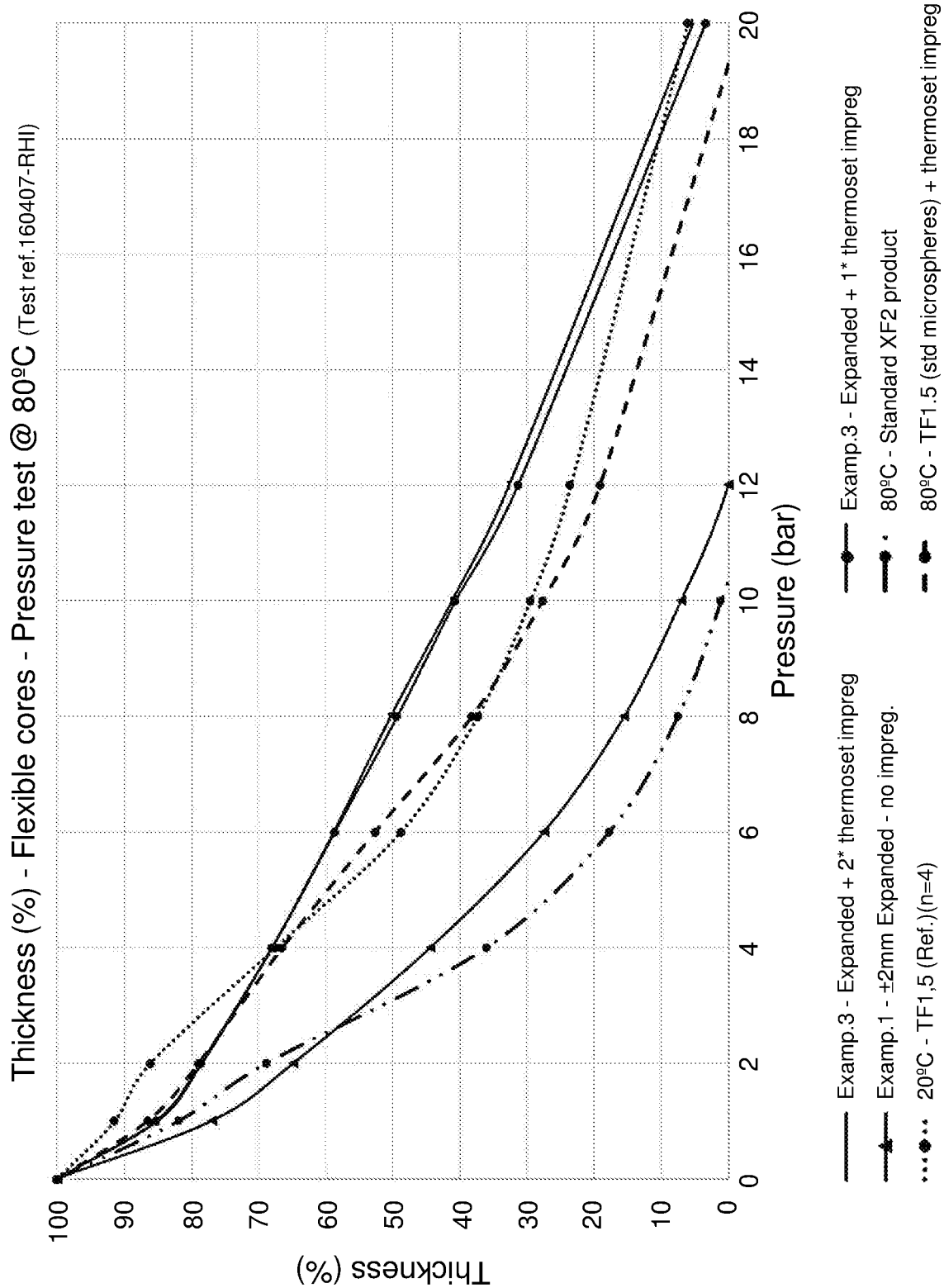
FIG. 1 shows the results of pressure tests carried out at 80° C. on various core materials.

In a first aspect, the present invention is accordingly directed to a core material, suitable for use in a closed mold system, based on at least one fibrous web containing a foam-structure within the web, said foam-structure being formed of a plurality of members that are separated from each other by channels, wherein said core material has a compression-resistance of greater than 40% at a pressure of 4 bar and at a temperature that is greater than or equal to 80° C.

The compression-resistance typically decreases by an increase of the temperature. For applications of the core material under both elevated pressures and temperatures, it is preferred that the compression-resistance remains sufficient under elevated temperature and does not decrease too much. Although, some decrease in compression-resistance is typically unavoidable, for a broad application of the core material it is preferable that the compression-resistance of the core material remains sufficient at an entire range of temperatures. For instance, it is preferred that the core material has a compression-resistance of greater than 40% at a pressure of 4 bar and at any temperature in the range of 80-170° C., or for instance in the range of 80-140° C.

In certain cases, in particular in cases wherein molding is invariably carried out at a certain temperature, compression-resistance over an entire range may not be required and it may be sufficient to have a core material that meets the requirement at that a certain temperature.

In general, higher temperatures in autoclave molding processes are advantageous in terms of curing and overall production times. Accordingly, it is preferred that the compression-resistance of the core material is greater than 40% at a pressure of 4 bar and a temperature that is greater than or equal to 120° C., preferably greater than or equal to 140° C.

In preferred embodiments, the compression-resistance is greater than 60%, preferably greater than 80% at any of the above-mentioned pressures and temperatures.

The compression-resistance of the core material of the present invention is expressed above as a compression-resistance at a pressure of 4 bars. However, the compression-resistance of the core material may also be expressed as a compression-resistance at pressures higher than 4 bars.

For instance, the core material may have a compression-resistance greater than 30% at a pressure of 6 bar and at a temperature that is greater than or equal to 80° C. Preferably, the compression-resistance is greater than 40%, preferably greater than 50% at a pressure of 6 bar and at a temperature that is greater than or equal to 80° C. The core material may also have a compression-resistance of greater than 30% at 8 and at a temperature that is greater than or equal to 80° C. and/or have a compression-resistance of greater than 30% at 10 bar and at a temperature that is greater than or equal to 80° C.

The compression-resistances at a higher pressure than 4 bars may complement or substitute the compression-resistances expressed at a pressure of 4 bar. Preferably, the compression-resistances at a higher pressure than 4 bars complement the compression-resistances at a pressure of 4 bar meaning that the core material have the compression-resistance at 4 bar as described above as well as the compression-resistance at 6, 8 and/or 10 bar as defined in the previous paragraph.

An additional advantage of compression-resistance of the present core material, is that it may make the core material suitable for use in resin transfer molding (RTM) methods to inject the resin in the mold. Pressures of 2 to 15 bar and sometimes even higher are typical pressures for use in RTM. 3-dimensional shapes may also be produced using techniques such as vacuum infusion and "RTM Light", wherein RTM Light uses typical pressures up to 2 or 3 bars. The core material can also be used in other processes involving elevated pressures (e.g. up to 15 bar) and/or temperatures (e.g. up to 200° C.).

The present inventors have surprisingly found that the compression-resistance under elevated pressures and temperatures of the core materials can be increased by a number of measures, each contributing to the compression-resistance of the core material. This enables an accurate selection of the required compression-resistance, without unnecessarily compromising the other requirements of the core materials such as drapability, allowing fast flow of the resin through the core material or choosing a level of these properties that suits the application or process.

One measure to obtain the compression-resistance of the present invention, is the use of high-temperature expendable microspheres to obtain the foam-structure. Expendable microspheres are known in the art and for instance also described in the above-mentioned EP1010793 and EP1542845.

The members form 'isles' within or upon the web, which members are at least largely surrounded by channels, through which channels the resin can flow. The channels may also function to allow the resin to penetrate the core material since the channels are largely void. In addition, the channels may assure a certain drapability. The channels are largely free of web material or fibers, although some fiber material may be present to provide sufficient consistency of the core material. Preferably, the material content in the channels should be low enough to allow a sufficient permeability to allow sufficient penetration of resin. The members can also comprise microspheres or being formed thereof. The members are believed to provide the compression-resistance of the core material.

The present inventors found that, in particular at pressures up to about 9 bar at elevated temperatures (e.g. 80° C. and higher), the compression-resistance of the core material can be mainly attributed to the presence of the microspheres in the members. In addition, the present inventors have found that the microspheres used in known core materials may not be sufficiently temperature resistance, viz. their contribution to the compression-resistance decreases considerably at higher temperatures. However, it was further found that microspheres having a high initial temperature (also referred to as activation temperature) perform better in this respect. Accordingly, the members comprise microspheres having an activation temperature of at least 140° C., preferably between 150 and 180° C., more preferably between 155 and 175° C. Microspheres having an even higher activation temperature such as up to 220° C. may also be used. Commercially available microspheres having an activation temperature of between 195 and 215° C. may thus also be suitable.

Expendable thermoplastic microspheres, e.g. of a thermoplastic polymer based on an alkylmethacrylate, such as methyl methacrylate, acetonitril (such as polyacetonitril (PAN)), vinilydene chloride or a combination thereof are commercially available, e.g. as Expancel™ by AKZO-NOBEL. Particularly good results have been obtained with Expancel™ microspheres of the type 980 DU 120, that are characterized by an activation temperature ($T_{start}$) of 158-173° C.

Additionally or alternatively to the use of the high temperature microspheres, the compression-resistance of the present invention, may be obtained by having a core material wherein said fibrous web is impregnated with a thermosetting polymer. This means that the both the fibrous web at the site of the members as well as at the site of the channels separating the members is impregnated with the thermosetting polymers. The impregnation of the fibrous web is typically carried out after the members and the channels have been formed (vide infra) but it may, in addition or alternatively, also be carried out before the members and the channels are formed.

In the embodiments wherein the fibrous web is impregnated with the thermosetting polymer, good compression-resistance is obtained over a broad range of elevated pressures (e.g. up to 12 bar) and temperatures (e.g. 80-200° C.).

The drapability of the impregnated core material is generally slightly lower than an otherwise identical non-impregnated core material. However, in certain applications of the core material, for instance in applications comprising form-setting, the drapability of the core material may not be a hard requirement. Form-setting is a process wherein a minorly curved or straight composite structure is pre-formed and subsequently reshaped, typically under pressure and/or elevated temperature, to a more complex 3D structure. Although, the minor curvature or lack of curvature may ease the requirement of drapability of the core material, it may— e.g. for a broad application of the core material—nonetheless be beneficial to have good drapability properties.

For particular applications wherein the high performance of impregnated core materials associated with the impregnation is not fully required and the performance of non-impregnated core material suffices, it may be preferable not to impregnate the core material with the thermosetting polymer.

The thermosetting polymer preferably comprises a polyacrylate, a acrylic copolymer and/or polycarboxylic acid that is thermoset with a polyol. Alternatively or additionally a styrene maleic anhydride copolymer can also be used. Good results have been obtained with polymers comprising a polyacrylate.

Additionally or alternatively to the above-described measures, good compression-resistance at elevated temperatures and pressures may also be obtained by providing a core material having a higher surface area of the members per total surface area of the core material when compared to the known core materials. This generally means that the surface area of the members is larger (i.e. the members are broader), while the surface area of the channels is smaller (i.e. the channels are more narrow), compared to the known core materials. However, since the flexibility and/or drap ability of the material can be mainly attributed to the presence of the channels, the channels are preferably not too narrow or non-existing in order to maintain the desired flexibility and/or drap ability of the material.

The shape of the members and the surface area of the members can influence the mechanical properties of a pre-preg product that comprises the core material. In processes for the preparation of composite articles and in particular in autoclave molding processes, pre-preg products may be used. Pre-preg products are commonly products comprising the reinforcement fibers and only partially cured (B-stage) resin.

In general, a larger surface area of the members can favorably improve the bending stiffness of a laminate comprising the core material of the present invention that is sandwiched between two pre-preg layers. For instance, a hexagonal shape of the members of approximately 3 mm by 4 mm, separated by small channels, (see for instance EP1010793), is favorable over a random dot pattern as for instance described in EP1542845.

On the other hand, members that are shaped in a random dot pattern, as for instance described in EP1542845, can be favorable to improve shear strength of said laminate comprising the core material of the present invention that is sandwiched between two pre-preg layers over said hexagonal shape of the members.

Without wishing to be bound by theory, the present inventors believe that above is explainable by the fact that the compression-resistant members also contribute to the stiffness of the laminate. With increasing the surface area of the members, the compression resistance as well as the stiffness of the laminate may increase. This effect may be explained by the following mechanical formulae:

$$S=P*L^3/(E*I) \text{ and } I=1/12*b*h^3$$

wherein:
S=Deflection
P=Load
L=span length
E=Young's modulus
I=area moment of inertia
b=width of area
h=distance of an element to the neutral line The bending stiffness in the above formula can be defined as E*I.

Less compression of the core results in more thickness (i.e. larger h) which will result in a higher bending stiffness. Also, more available pressure area provided by the members with respect to the total area, will result in a higher residual thickness when the same pressure is applied.

The channels between the members can provide opportunity for the resin (e.g. the excess resin from a pre-preg) to connect the upper and lower pre-preg layers of the sandwich laminate. As such, higher shear strength can be obtained with the random dot pattern as described above. This random dot pattern may provide more and more frequent resin connections between the upper and lower pre-preg layers the laminate. The degree of these connections can further relate to the free volume of a core. The higher the free volume, the more resin flows into the core and connects the layers of the laminate.

In case pre-preg products and layers are used, the amount of available resin is limited. Accordingly, in order to prevent the transfer of too much resin from the pre-preg products into the free volume of the fibrous web it is preferred that the free volume is not too large. Too much resin being transferred may result in dry spots of the skin fibers, with negative impact on appearance and mechanical properties of the laminate. Vice versa, in order to prevent the amount of the above-described connections between the pre-preg layers dropping below a certain critical threshold, the surface area of the members should not be too large. In case, the amount of said connection is too low, the laminate may become sensitive to delamination when bending forces are applied. The preferred ratio of free volume and surface area of the member typically depends on type of pre-preg, resin and resin content.

The core materials as described in EP1010793 and EP1542845 may be prepared by screen printing processes as described therein. However, using a mesh screen for screen printing as such to provide the dimension of the members and the narrow channels in accordance with the present invention is practically not feasible as the screen wires would become too thin.

Surprisingly, the present inventors have found a method for the preparation of the core material with a large member surface area to channel surface area without compromising the drap ability of the core material. Said method comprises introducing unexpanded microspheres into the fibrous web using at least one binder, followed by expanding the introduced unexpanded microspheres while restricting the expansion of the microspheres in the direction orthogonal to the plane of the core material.

It was found that the core material obtainable by the method according to the present invention has particularly favorable compression-resistance properties, without notably sacrificing the other above-described requirements of the core material.

Without wishing to be bound by theory, the present inventors believe that the improved compression-resistance of the core material obtainable by the method according to the present invention can be explained as follows.

In general, unexpanded microspheres are expanded under the influence of one or more blowing agents. The blowing agent has usually been incorporated in the expandable microspheres. The presence of this blowing agent is responsible for an expansion of the microspheres when a fibrous web, comprising the micro-spheres, is cured. Thus, the microspheres are pressed into the fibrous web in unexpanded form, for example by means of a paste, such as a foam paste.

The blowing agent may be a chemical or physical blowing agent, such as azodicarbonamide, isobutane, isopentane, pentane, freon, iso-octane etcetera.

The screen printing methods as described in EP1010793 and EP1542845, the expansion of the microspheres is not restricted in any direction. As a result, the microspheres may theoretically expand in all directions. However, in case the expansion of the microspheres in a certain direction is restricted, the microspheres expand more in the other directions. The expanded microsphere may be considered to be flattened, e.g. shaped as oblate spheroids, while maintaining essentially the same volume compared to spheres that are expanded in a non-restrictive manner. The present microspheres may thus expand more in the direction of the plane of the core material (i.e. orthogonal to the direction of the restricted expansion). Concomitantly, the members may become broader and the channels may become more narrow upon expansion of the microspheres. This results in a higher surface area of the members relative to the surface area of the channels. To further aid expansion within the restricted orthogonal direction to the plane of the core, one can increase the amount of binder-microsphere mixture that is transferred into the web by the screen printing process to a level that is higher than strictly needed to create the members. In this way one can influence the density of the final material, which has an impact on its typical properties like compression-resistance.

Expanding the microspheres while restricting the expansion preferably comprises heating under a pressure in the direction orthogonal to the plane of the core material. The restriction of the expansion by heating under pressure may for instance be carried out by using a plate press, a double belt press or a calendar, or a combination thereof. The use of a calendar is preferred since it enable a more accurate and precise control over the final thickness of the core material. Accordingly, the heating under a pressure preferably comprises calendaring, or calendaring with a combination of said methods.

In a typical preparation process, the microspheres are introduced by screen printing, followed by a drying step at e.g. about 100° C. In a next step, the microsphere may be expanded and the binder may be cured at high temperatures (e.g. about 200° C.). In a preferred embodiment, this last step comprises calendaring to restrict the microsphere in expanding in the direction orthogonal to the plane of the core material.

Alternative or additionally to screen printing, the introduction of the microspheres can also be carried out by impregnation, scattering or a combination thereof.

An advantage of the present invention is that a core material can be provided that has a thickness of less than 1 mm. The core material may for instance have a thickness of between 0.4 to 0.9 mm, or about 0.7 mm.

Previous processes without calendaring did not allow a sufficiently accurate control over the thickness enough to enable the preparation of thin core materials. The method of the present invention however, in particular the method comprising calendaring, enables accurate control over the thickness, e.g. up to the tenth of a millimeter. Core materials having a thickness of less than 1 mm are preferred for application in thin articles, e.g. composite panels for use in the automotive industry.

With the method of the present invention, a core material can be provided having a lower free volume of the fibrous web compared to known methods. The free volume is to be understood as the volume of the material that can be accessed by resin. The remainder of the volume will be formed by the members, some fibers and optionally the thermosetting polymer. A lower free volume contributes to the compression-resistance of the core material.

With known methods (e.g. those described in EP1010793 and EP1542845) it is not possible to provide a low free volume without undesirably reducing the drap ability and permeability of the core material because a low free volume could only be obtained by increasing the size of the members while maintaining the width of the channels—which in these known methods is bound to the minimal dimensions of the screen used in the screen printing. However, the present invention may advantageously provide more narrow channels such that a lower free volume can be obtained while maintaining the other favorable properties of the core material. Accordingly, the free volume of the present core material is preferably less than 60%, preferably less than 40%, for instance about 20 to 40%.

The unexpanded microspheres may be introduced as a blend with the binder. Suitable binders in this regard are for instance lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, polyvinyl acetate, partially hydrolyzed polyvinyl acetate, polyvinyl alcohol, polyvinyl pyrrolidone, polyester resins, and so forth. Optionally these binders can be provided with acidic groups, for example by carboxylating the binders. A suitable carboxylating agent is, for example, maleic anhydride. In addition, the binder, paste-like composition optionally contains water, surfactants, foam stabilizers, fillers and or thickeners, as has been described in EP0190788.

It was found that the dry weight ratio of binder to microspheres is of an influence to the compression-resistance of the core material, in particular at higher pressures (e.g. above about 10 bar). It is preferable that the binder and the unexpanded microspheres are present in the blend in a dry weight ratio of more than 12 to 1, preferably more than 14 to 1 and more preferably more than 18 to 1.

The method according to the present invention may further comprise a step of impregnating the fibrous web with a thermosetting polymer followed by heating the impregnated fibrous web above the thermosetting temperature of the thermosetting polymer. The impregnation of the fibrous web is preferably carried out after the expansion of the microspheres since the fibrous web is more flexible before the impregnation, which facilitates the expansion of the microspheres.

The fibrous web to be used according to the invention will usually be a non-woven, which may be reinforced, based on conventional fibers. The manufacture of suitable non-wovens has for instance been described by Dr. H. Jorder, "Textilien auf Vliesbasis" (D. V. R. Fachbuch, P. Kepper Verlag). It is also possible to use a combination of a non-woven fibrous web with a reinforcing fabric, one within or on top of the other.

The fibers of the web are preferably selected from the group of natural fibers, glass fibers, metal fibers, ceramic fibers or synthetic fibers, such as acrylic, polyethylene, polypropylene, polyester, polyamide (aramide), carbon or polypropylene fibers and combinations thereof. More preferably the fibers are selected from the group of glass fibers, polyester fibers, polyester-polyethylene bicomponent fibers and combinations thereof. Very good results have been achieved with polyester fibers. Polyester fibers have been found to have very good adherence with the resin and tend to have a favorably low moisture content.

According to a very convenient method, the non-woven is based on a combination of polyester fibers and polyethylene-polyester bicomponent fibers (or other low temperature melting fibers or powders). These types of webs have been thermally bonded by the bicomponent fibers. By heating the web to the initial expansion temperature of the microspheres, which is above the melting point of the polyethylene bond, the web becomes loose and will expand easily. After expansion, and curing the final material again has its good bond, resulting in the advantageous combination of properties of the invention. At the same time the web is very easy to handle at the initial stages of the process, thanks to the thermal bonding. However, the above is not limiting or excluding any other type of web bonding or formation for the used non-woven fibrous web, known by those skilled in the art, for use in the present invention.

Particular good results have been obtained in case the fibrous web comprises a needle-punched non-woven, i.e. a non-woven that is obtained by a needle-punch production process. Without wishing to be bound by theory, it is believed that needle-punched non-wovens are preferred over other types of non-wovens, for instance carded chembond non-wovens, because the typical random fiber orientation and/or higher fiber content of needle-punched non-wovens (at comparable weight per square meter) result in improved tensile strength of the core material. The improved tensile strength is particularly observed in the cross-direction of the core material. A homogeneous strength of the fibrous web and the core material (i.e. similar strengths in multiple directions of the fibrous web) is generally favorable in machine processing or production of composite parts.

An additional advantage of needle-punched non-wovens is that a web binder is not required for the construction of the fibrous web. In contrast, for carded chembond non-wovens a web binder is typically required. The presence of a web binder is generally not preferred since this binder may (partially) degrade at higher temperatures, for instance at the higher temperature applied in the expansion step in accordance with the present invention. The needle-punched non-woven is thus preferable since it can advantageously be used at higher process temperatures in the expansion step in accordance with the present invention.

An advantage of the core material of the present invention, is that the material has good thickness relaxation, or spring back, after a pressure load when the load is removed, in comparison with conventional core materials. The improved thickness relaxation can be seen as an indication that the members of the present core material are mostly still intact and functional. In case thickness relaxation is low, as may be observed for conventional core materials, the members will typically be more damaged permanently.

In processes for the preparation of composite articles and in particular in autoclave molding processes, pre-preg products may be used. Pre-preg products are commonly products comprising the reinforcement fibers and only partially cured (B-stage) resin. The present invention also encompasses a pre-preg product comprising the above-described core material a curable resin.

A further aspect of the present invention encompasses a method for the preparation of a shaped (fiber-reinforced plastic) article, said method comprising placing a mold that comprises the core material with a curable resin, or a pre-preg product in an autoclave, followed by curing the curable resin in the autoclave.

For the purpose of clarity and a concise description features are described herein as part of the same or separate embodiments, however, it will be appreciated that the scope of the invention may include embodiments having combinations of all or some of the features described.

The invention can be illustrated with the following examples.

EXAMPLE 1

High-Temperature Microspheres

A web was prepared consisting of about 80 wt. % polyester fibers and 20 wt. % binder (acrylate).

A binder-microsphere blend was made by mixing 3 kg of high-temperature expandable microspheres (Expancel™, AKZO-NOBEL) into 97 kg of acrylate binder. The dry solids content of the acrylate binder was about 52 wt. % and the dry weight ratio binder to microspheres was about 14.8 to 1.

The binder-microsphere mixture was applied to the web by rotary screen printing, wherein the mixture was pressed into the web. After printing the web was dried at about 110° C. and subsequently expanded to a thickness of about 2 mm at a temperature of about 220° C. Simultaneously the web was cured.

EXAMPLE 2

Impregnation with a Thermosetting Polymer

A web was prepared consisting of about 80 wt. % polyester fibers and 20 wt. % binder (acrylate).

A binder-microsphere blend was made by mixing 5 kg of expandable microspheres having an activation temperature of about 125° C. (Expancel™, AKZO-NOBEL) into 95 kg of acrylate binder. The dry solids content of the acrylate binder was about 52 wt. % and the dry weight ratio binder to microspheres was about 11.6 to 1.

The binder-microsphere mixture was applied to the web by rotary screen printing, wherein the mixture was pressed into the web. After printing the web was dried at about 110° C. and subsequently expanded to a thickness of about 1.5 mm at a temperature of 200° C. Simultaneously the web was cured.

Next, the fibrous web was impregnated with a water-based polyacrylic acid polyol mixture.

After impregnation, the thermosetting polymer was cured at a temperature of about 150° C.

EXAMPLE 3

High-Temperature Microspheres and Impregnation with a Thermosetting Polymer

A core material was prepared as describe in Example 1 and was impregnated as described in Example 2 resulting in a material of about 1.7 mm.

EXAMPLE 4

High-Temperature Microspheres and Calendaring

A web was prepared consisting of 80 wt. % polyester fibers and 20 wt. % binder (acrylate).

A binder-microsphere blend was made by mixing 3 kg of high-temperature expandable microspheres (Expancel™ 980DU120, AKZO-NOBEL) into 97 kg of acrylate binder.

The dry solids content of the acrylate binder was about 52 wt. % and the dry weight ratio binder to microspheres was about 14.8 to 1.

The binder-microsphere mixture was applied to the web by rotary screen printing, wherein the mixture was pressed into the web. After printing the web was dried at about 110° C. and subsequently expanded at a temperature of about 225° C. by restricting the expansion using a plate press to limit the thickness to about 1.8 mm. Simultaneously the web was cured.

EXAMPLE 5

High-Temperature Microspheres and Calendaring

Example 4 was repeated, but now the microspheres were expanded by restricting the expansion using a plate press to limit the thickness to about 1.4 mm.

EXAMPLE 6

Using a universal testing machine available from Zwick Roell AG being equipped with heating plates, the compression-resistance of the core materials obtained in Example 1-5 were analyzed at 80, 120 and 140° C. As a comparative example, Soric® XF2 core material obtainable from Lantor, Veenendaal, the Netherlands was analyzed as well.

Figure 2:
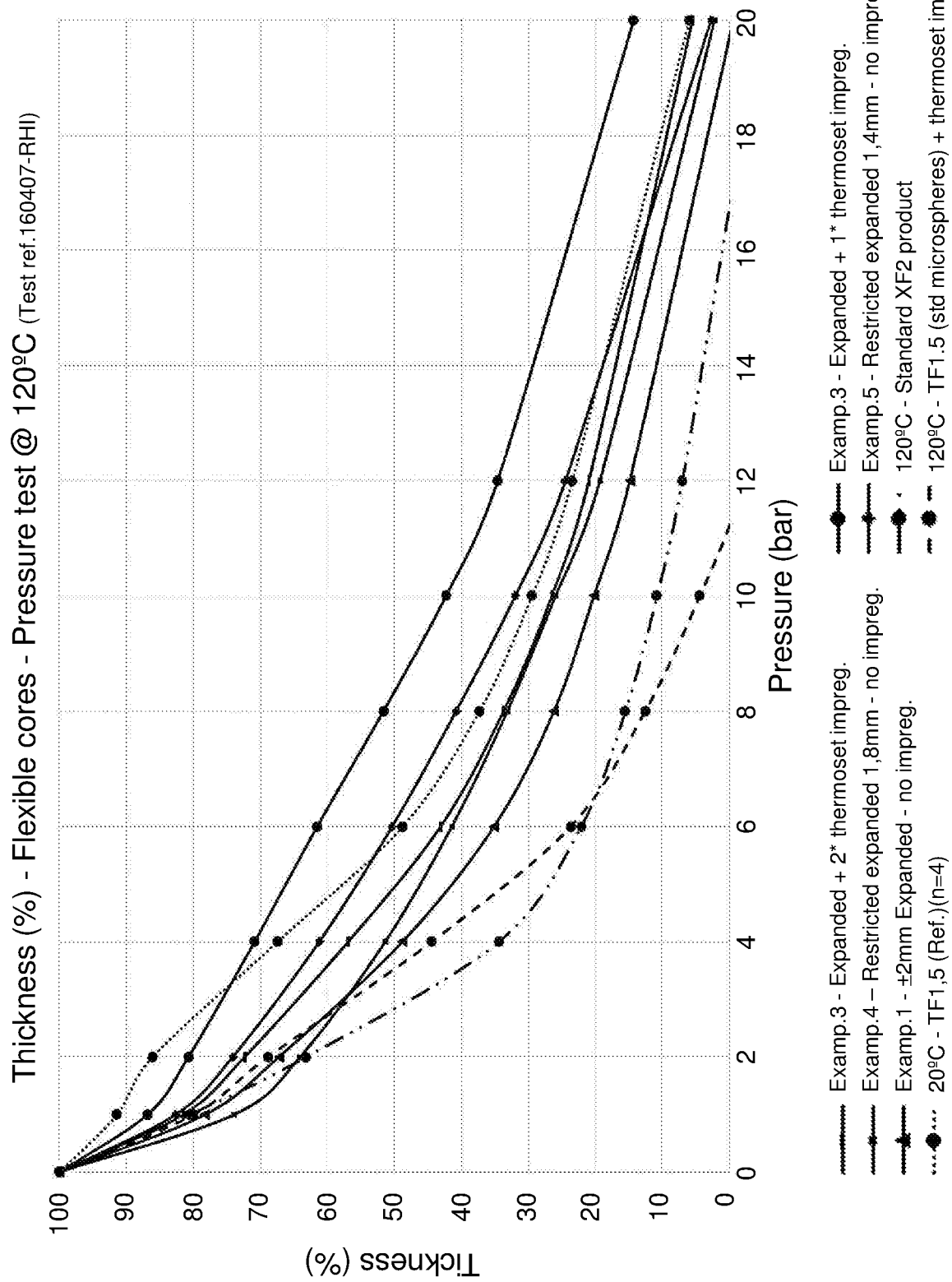
FIG. 2 shows the results of pressure tests carried out at 120° C. on various core materials.
Figure 3:
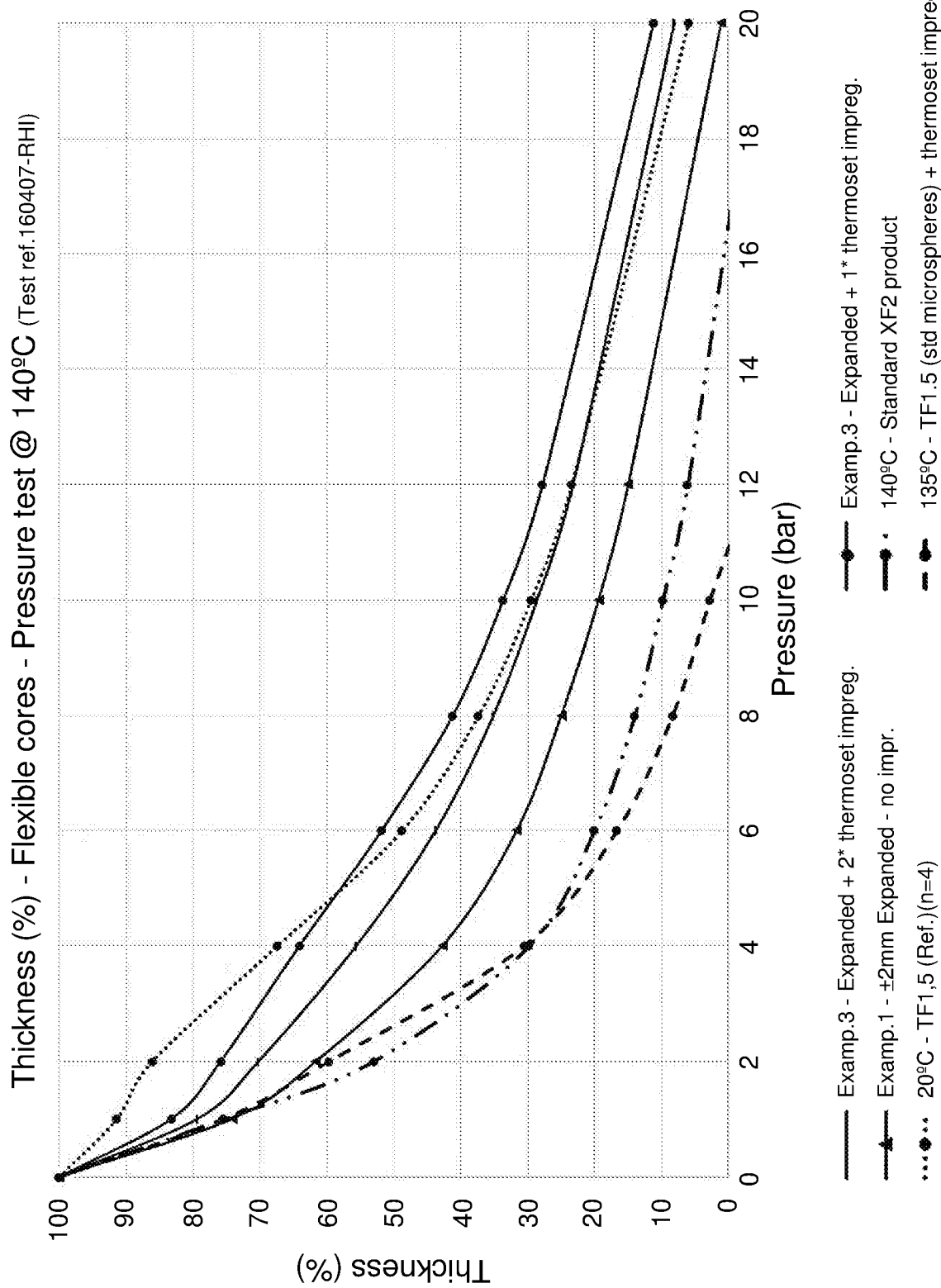
FIG. 3 shows the results of pressure tests carried out at 140° C. on various core materials.

The results are provided in FIGS. 1, 2 and 3.

EXAMPLE 7

A web was used consisting of 100 wt. % polyester fibers, which was bonded by needle-punching (i.e. a needle-punched non-woven).

A binder-microsphere blend was made by mixing 2.3 kg high temperature expandable microspheres (Expancel™ 980DU120, AKZO-NOBEL) into 97.7 kg of acrylate binder. The dry solids content of the acrylate binder was about 50 wt. % and the dry weight ratio binder to microspheres was 21 to 1.

The binder-microsphere mixture was applied to the web by rotary screen printing, wherein the mixture was pressed into the web. The screen print pattern was designed as a hexagonal pattern, as described in EP1010793.

After printing, the web was dried at about 100° C. and subsequently expanded at a temperature of about 225° C. while restricting the expansion using a belt press and a calender to limit the thickness to about 1.1 mm. Simultaneously the web was cured.

EXAMPLE 8

A web was used consisting of 100 wt. % polyester fibers, which was bonded by needle-punching (i.e. a needle-punched non-woven).

A binder-microsphere blend was made by mixing 2.3 kg high temperature expandable microspheres (Expancel™ 980DU120, AKZO-NOBEL) into 97.7 kg of acrylate binder. The dry solids content of the acrylate binder was about 50 wt. % and the dry weight ratio binder to microspheres was 21 to 1. The screen print pattern was designed as a random dot pattern, as described in EP1542845

After printing, the web was dried at about 100° C. and subsequently expanded at a temperature of about 225° C. while restricting the expansion using a belt press and a calender to limit the thickness to about 1.1 mm. Simultaneously the web was cured.

EXAMPLE 9

Figure 4:
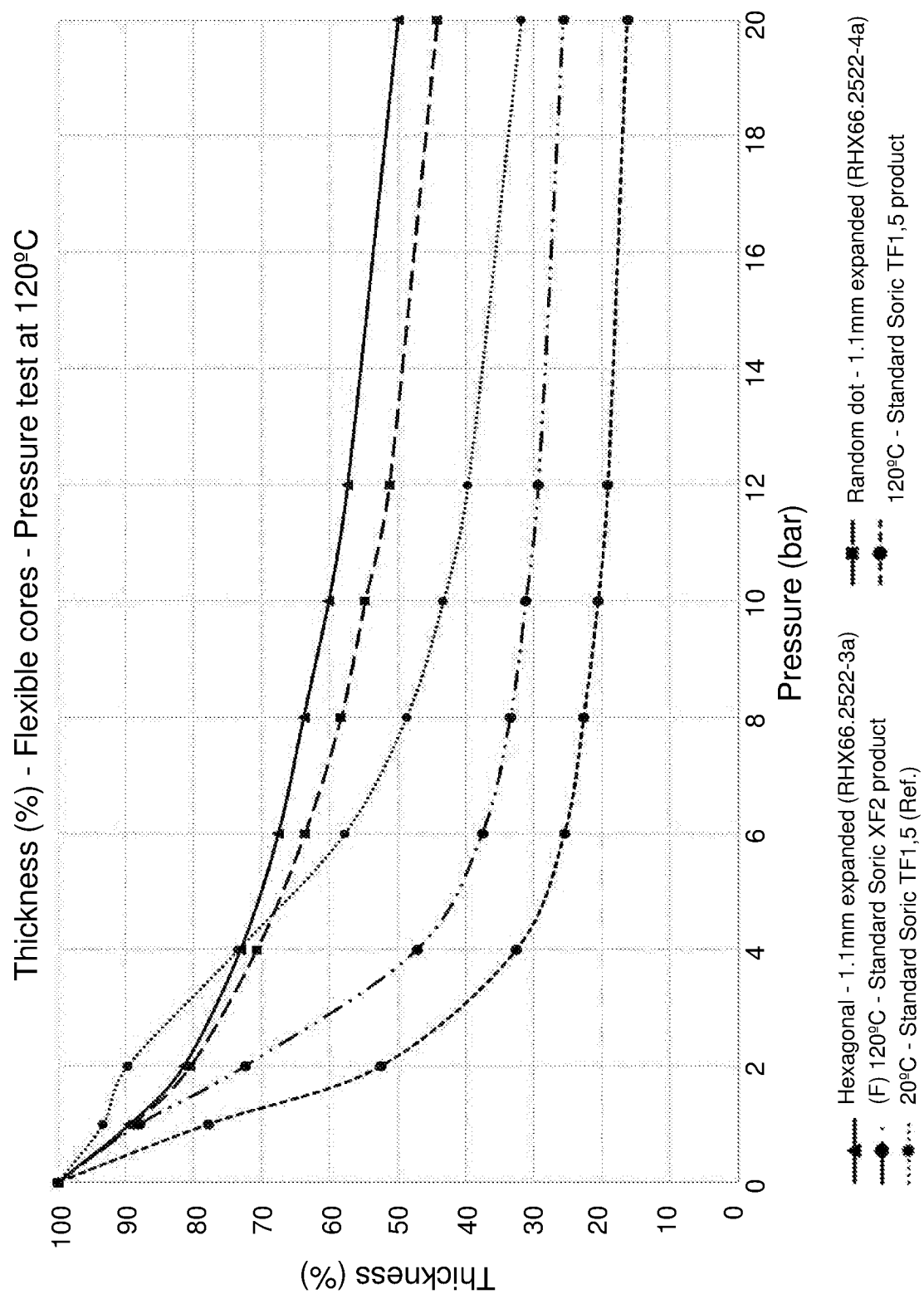
FIG. 4 shows the results of pressure tests carried out at 120° C. on further core materials.
Figure 5:
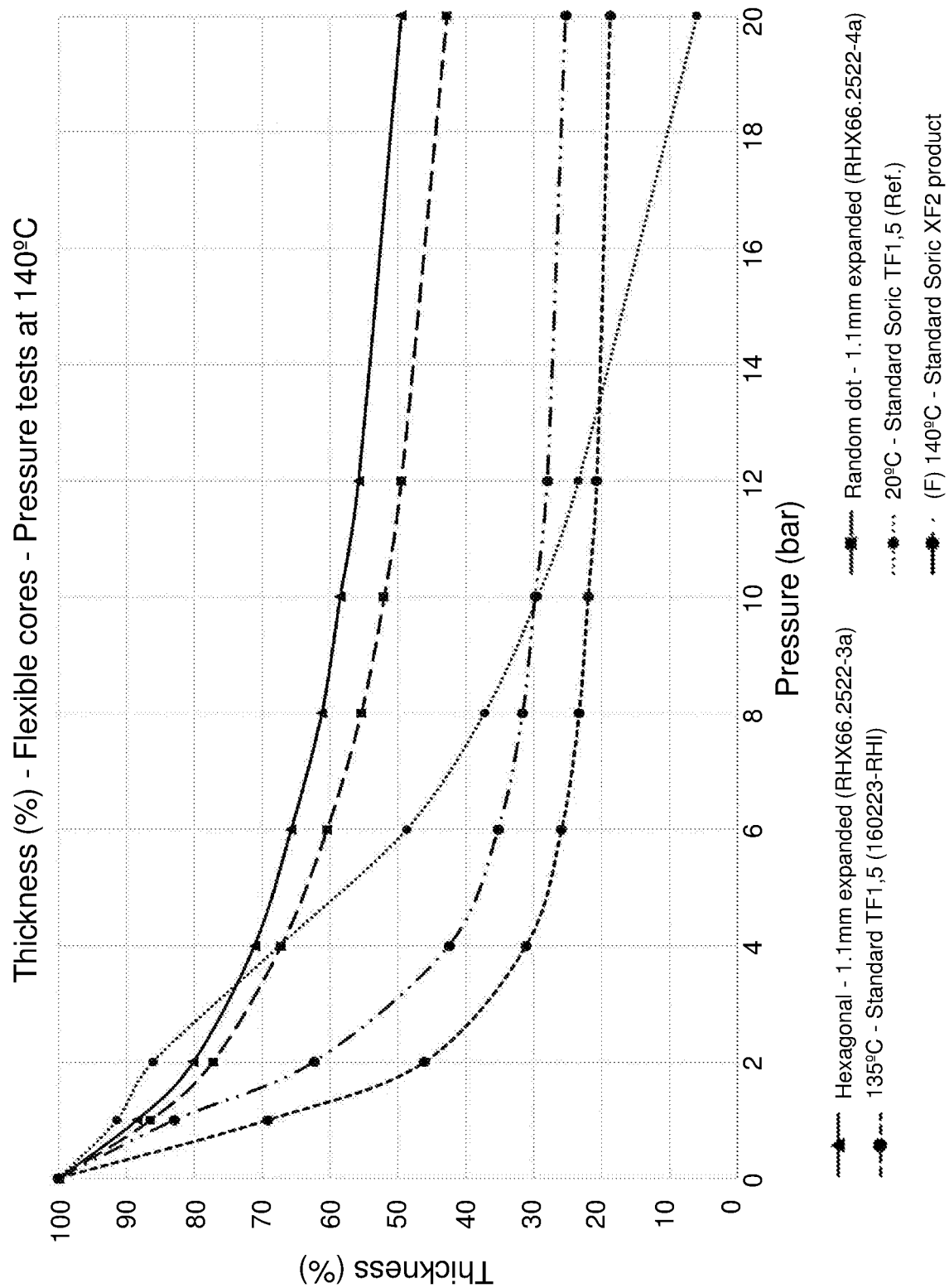
FIG. 5 shows the results of pressure tests carried out at 140° C. on further core materials.

Using a universal testing machine available from Zwick Roell AG being equipped with heating plates, the compression resistance of the core materials obtained in Example 7 and 8 were analyzed at 120° C. and 140° C. As a comparative example, Soric® XF2 and TF1.5 core materials obtainable from Lantor, Veenendaal, the Netherlands, were analyzed as well. The results are provided in FIGS. 4 and 5.

EXAMPLE 10

A web was used consisting of 100 wt. % polyester fibers, which was bonded by needle-punching.

A binder-microsphere blend was made by mixing 2.7 kg high temperature expandable microspheres (Expancel™ 980DU120, AKZO-NOBEL) into 97.3 kg of acrylate binder. The dry solids content of the acrylate binder was about 50 wt. % and the dry weight ratio binder to microspheres was 18 to 1. The screen print pattern was designed as a random dot pattern, as described in EP1542845

After printing, the web was dried at about 100° C. and subsequently expanded at a temperature of about 225° C. while restricting the expansion using a belt press and a calender to limit the thickness to about 1.1 mm. Simultaneously the web was cured.

Figure 6:
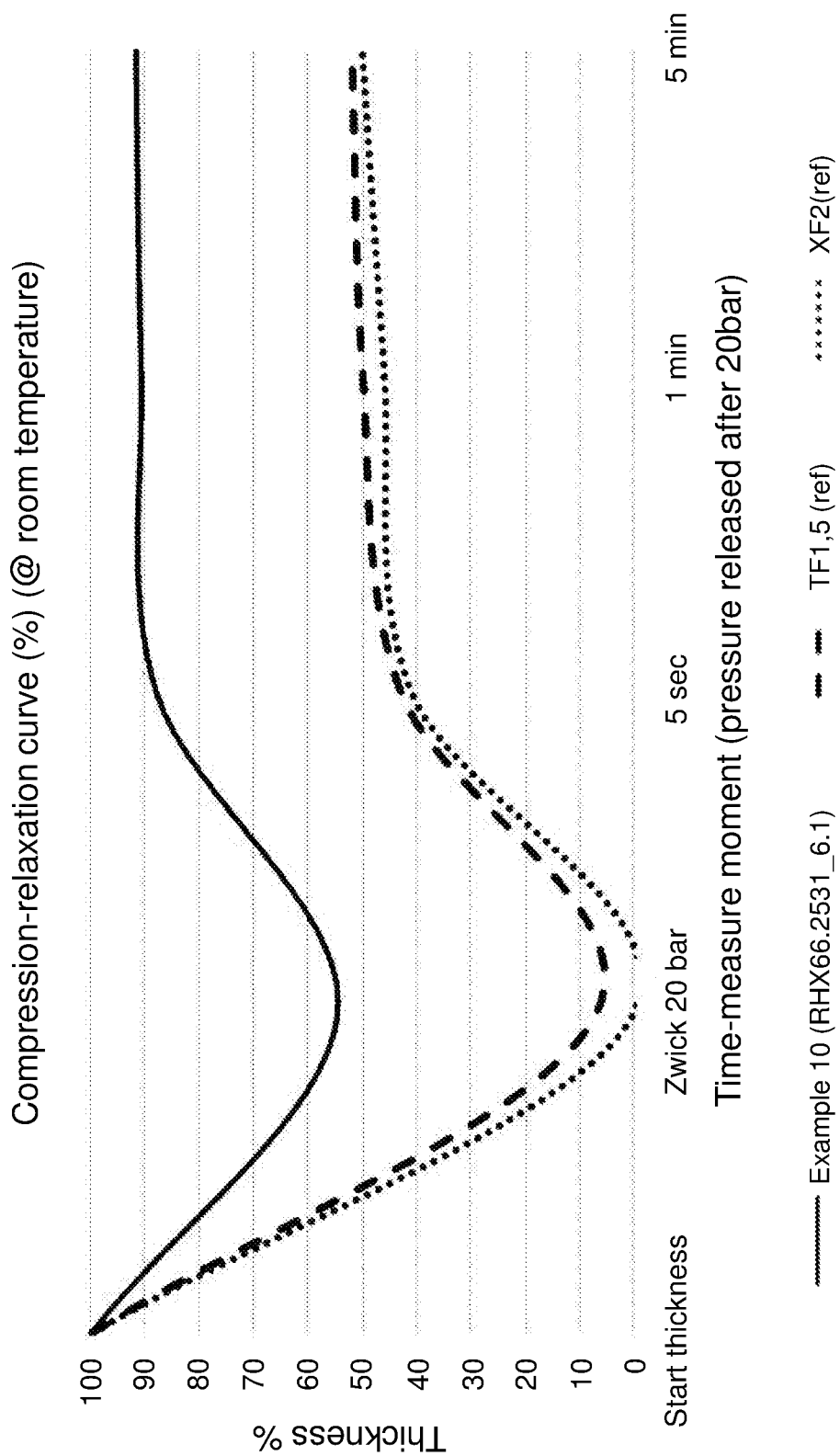
FIG. 6 shows the results of compression-relaxation tests carried out at room temperature on various core materials.

Using a universal testing machine available from Zwick Roell AG, the compression resistance of the core material obtained was analyzed until 20 bars at room temperature. Directly after terminating the test at 20 bar, and the pressure was released, the thickness of the test sample was measured at 3 time intervals: at 5 sec, at 1 minute and after 5 minutes. For this a universal thickness meter, available from Mitutoyo Corp. was used, equipped with a measuring stamp area of 38.5 $cm^2$ and a standard load of 40.0 $g/cm^2$. As a comparative example, Soric® XF2 and TF1.5 core materials obtainable from Lantor, Veenendaal, the Netherlands, were analyzed as well. The results are provided in FIG. 6.

The invention claimed is:

1. A core material, suitable for use in a closed mold system, based on at least one fibrous web containing a foam-structure within the web, said foam-structure being formed of a plurality of members comprising expandable microspheres that are separated from each other by channels and at least one binder, wherein said core material has a compression-resistance of greater than 40% at a pressure of 4 bar and at a temperature that is greater than or equal to 80° C., wherein the expandable microspheres have an activation temperature of at least 140° C. and a shape of an oblate spheroid, and wherein the binder and expanded microspheres are present in a dry weight ratio of more than 12 to 1.

2. The core material according to claim 1 having a compression-resistance of greater than 40% at a pressure of 4 bar and a temperature that is greater than or equal to 120° C.

3. The core material according to claim 2, wherein the temperature is greater than or equal to 140° C.

4. The core material according to claim 1, wherein said compression-resistance is greater than 60%.

5. The core material according to claim 1, wherein said fibrous web is impregnated with a thermosetting polymer.

6. The core material according to claim 5, wherein the thermosetting polymer comprises polyacrylate.

7. The core material according to claim 1, having a free volume of less than 60%.

8. The core material according to claim 7, wherein the free volume is less than 40%.

9. The core material according to claim 1, having a thickness of less than 1 mm.

10. The core material according to claim 9, wherein the thickness is less than 0.9 mm.

11. The core material according to claim 1, obtainable by a method comprising introducing unexpanded microspheres into a fibrous web using at least one binder, followed by expanding the introduced unexpanded microspheres while restricting the expansion of the microspheres in a direction orthogonal to the plane of the core material.

12. The core material according to claim 11, wherein the unexpanded microspheres are expanded by applying heat and applying pressure in a direction orthogonal to the plane of the core material.

13. The core material according to claim 12, wherein the pressure is applied by calendaring.

14. The core material according to claim 1, wherein the microspheres have an activation temperature between 150 and 220° C.

15. The core material according to claim 14, wherein the activation temperature is between 155 and 175° C.

16. A pre-preg product comprising the core material according to claim 1 and a curable resin.

17. A method for the preparation of a shaped article, said method comprising placing a mold that comprises a pre-preg product according to claim 16 in an autoclave, followed by curing the curable resin in the autoclave.

18. A method for the preparation of a shaped article, said method comprising placing a mold that comprises a core material according to claim 1 with a curable resin in an autoclave, followed by curing the curable resin in the autoclave.

19. A method for the preparation of a core material that is suitable for use in a closed mold system, said method comprising introducing unexpanded microspheres into a fibrous web using at least one binder, followed by expanding the introduced unexpanded microspheres while restricting the expansion of the microspheres in the direction orthogonal to the plane of the core material, which expanding of the introduced unexpanded microspheres comprises heating under pressure comprising calendaring, wherein the fibrous web comprises a foam-structure within the web, said foam-structure being formed of a plurality of members comprising said expanded microspheres that are separated from each other by channels and at least one binder, wherein said core material has a compression-resistance of greater than 40% at a pressure of 4 bar and at a temperature that is greater than or equal to 80° C., wherein said microspheres have an activation temperature of at least 140° C. and a shape of an oblate spheroid, and wherein the binder and expanded microspheres are present in a dry weight ratio of more than 12 to 1.

20. The method according to claim 19, wherein the unexpanded microspheres are introduced into the fibrous web by screen printing, impregnation, scattering or a combination thereof.

21. The method according to claim 19, said method further comprising impregnating the fibrous web with a thermosetting polymer followed by heating the impregnated fibrous web above the thermosetting temperature of the thermosetting polymer.

* * * * *